Feb. 11, 1936.  R. H. LAWSON ET AL  2,030,516
JACQUARD PATTERN MECHANISM FOR KNITTING MACHINES
AND METHOD OF PATTERNING EFFECTED THEREBY
Filed Jan. 2, 1932  13 Sheets-Sheet 1
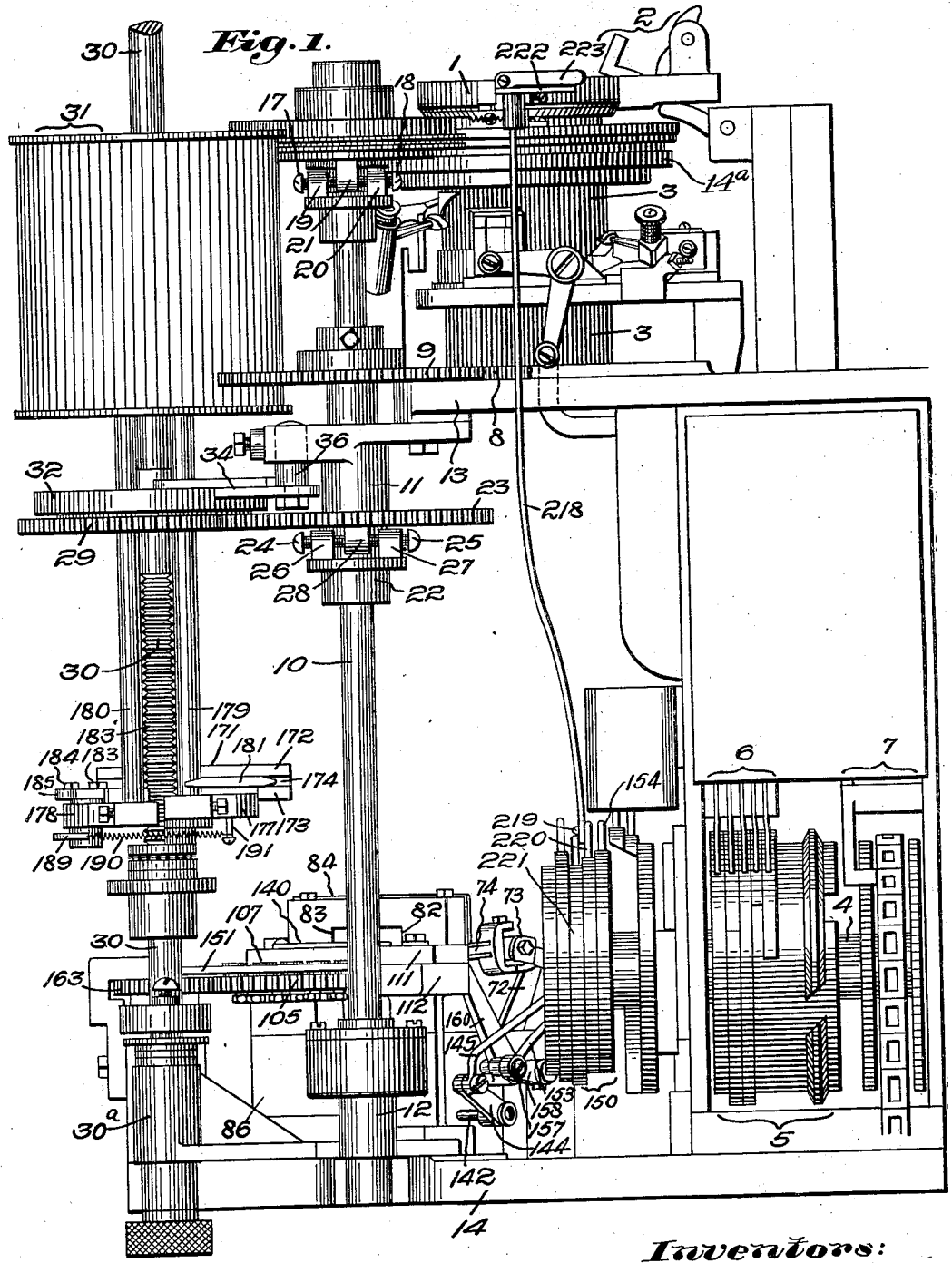
Inventors:
Robert H. Lawson,
Arthur N. Cloutier,
Alfred L. Hutton, Jr.
by Emery, Booth, Varney and Townsend  Attys.

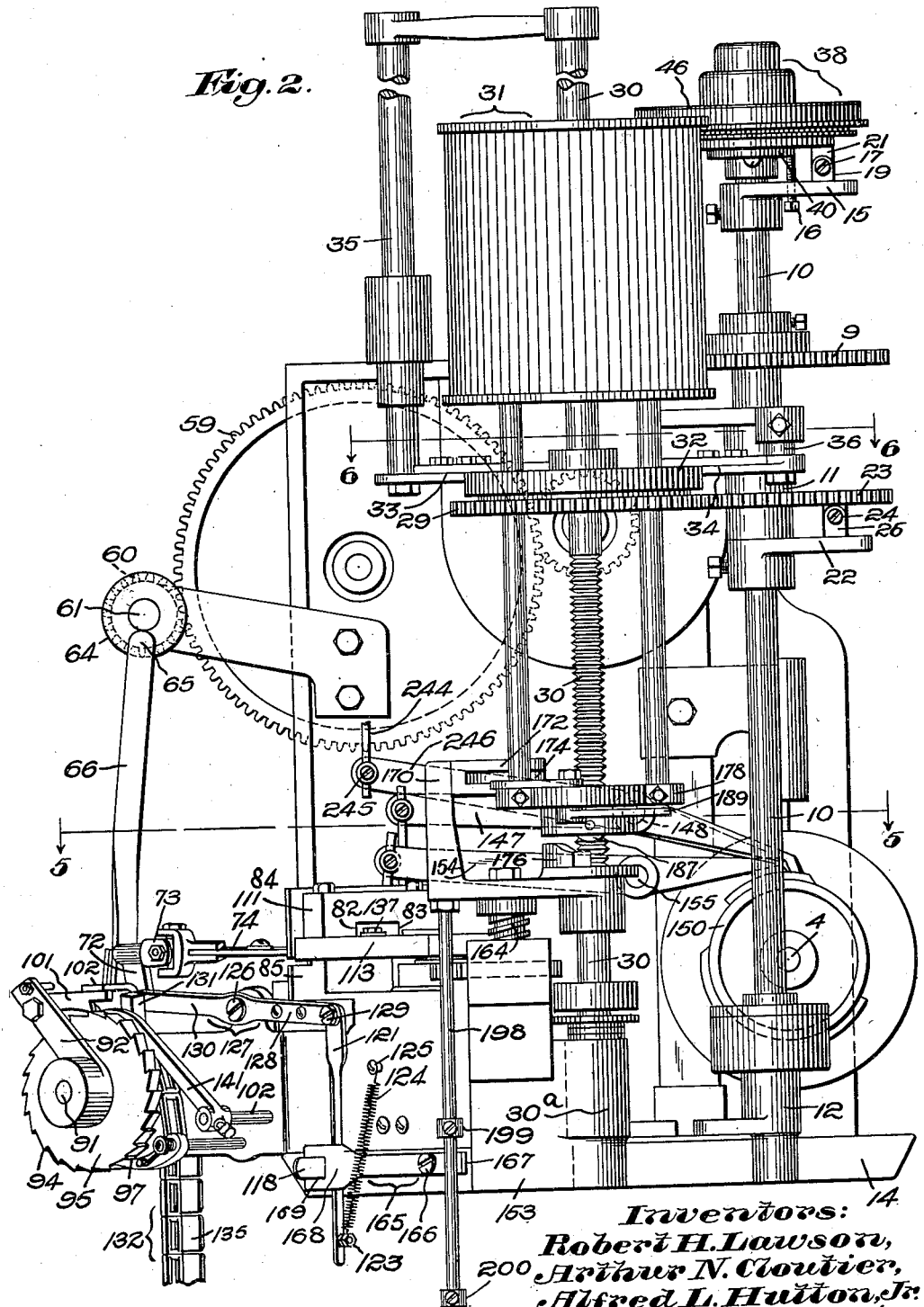

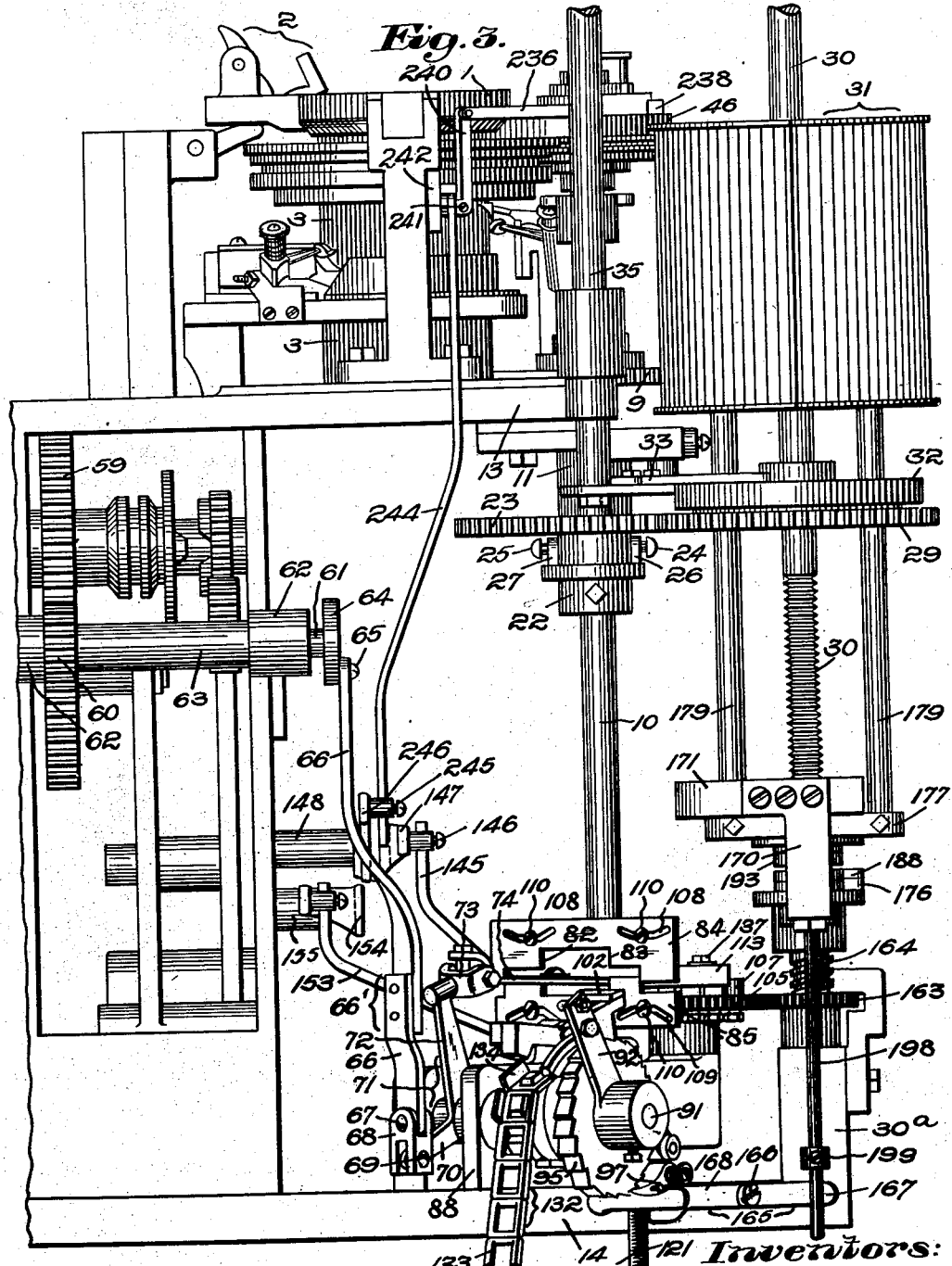

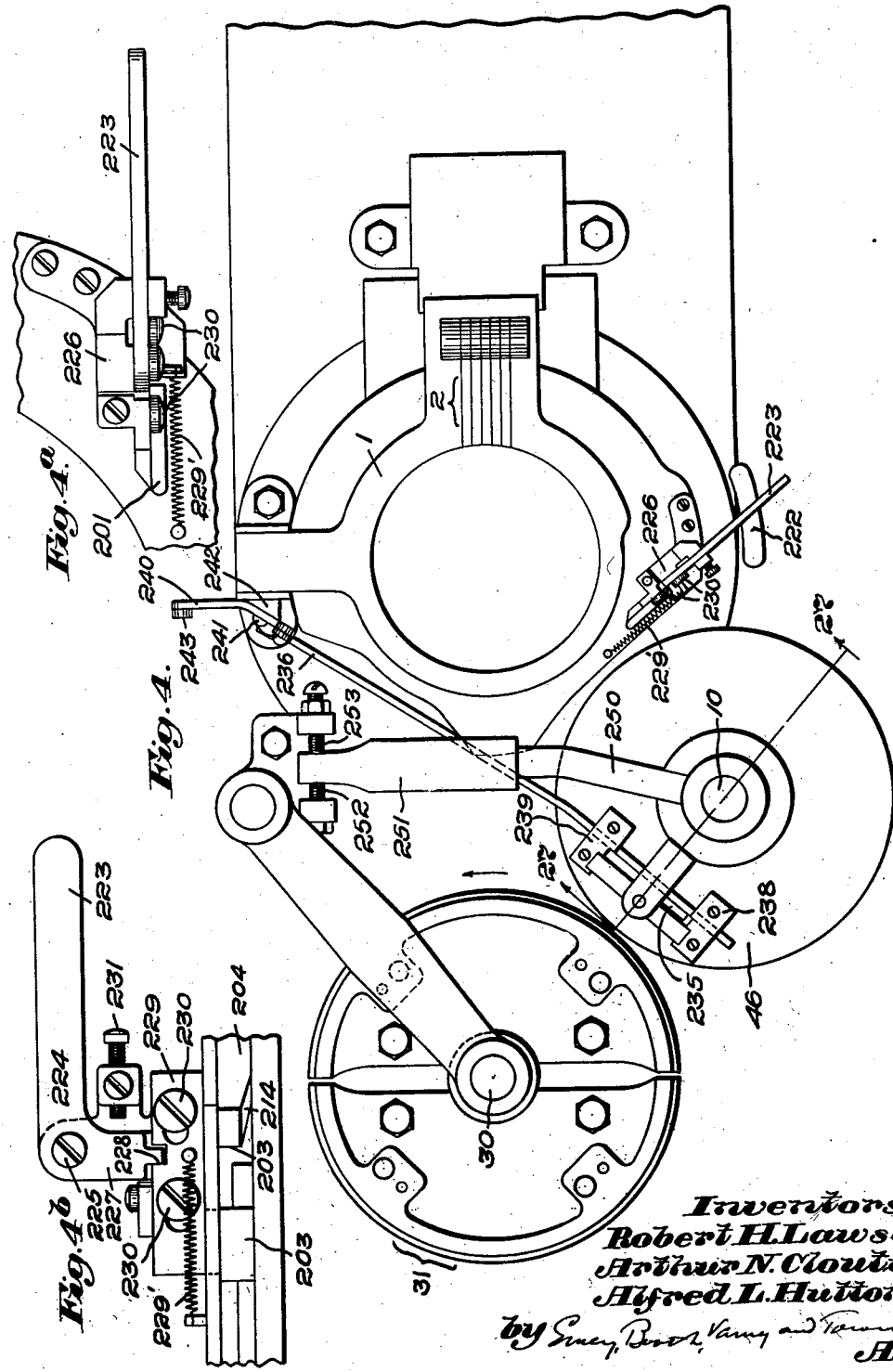

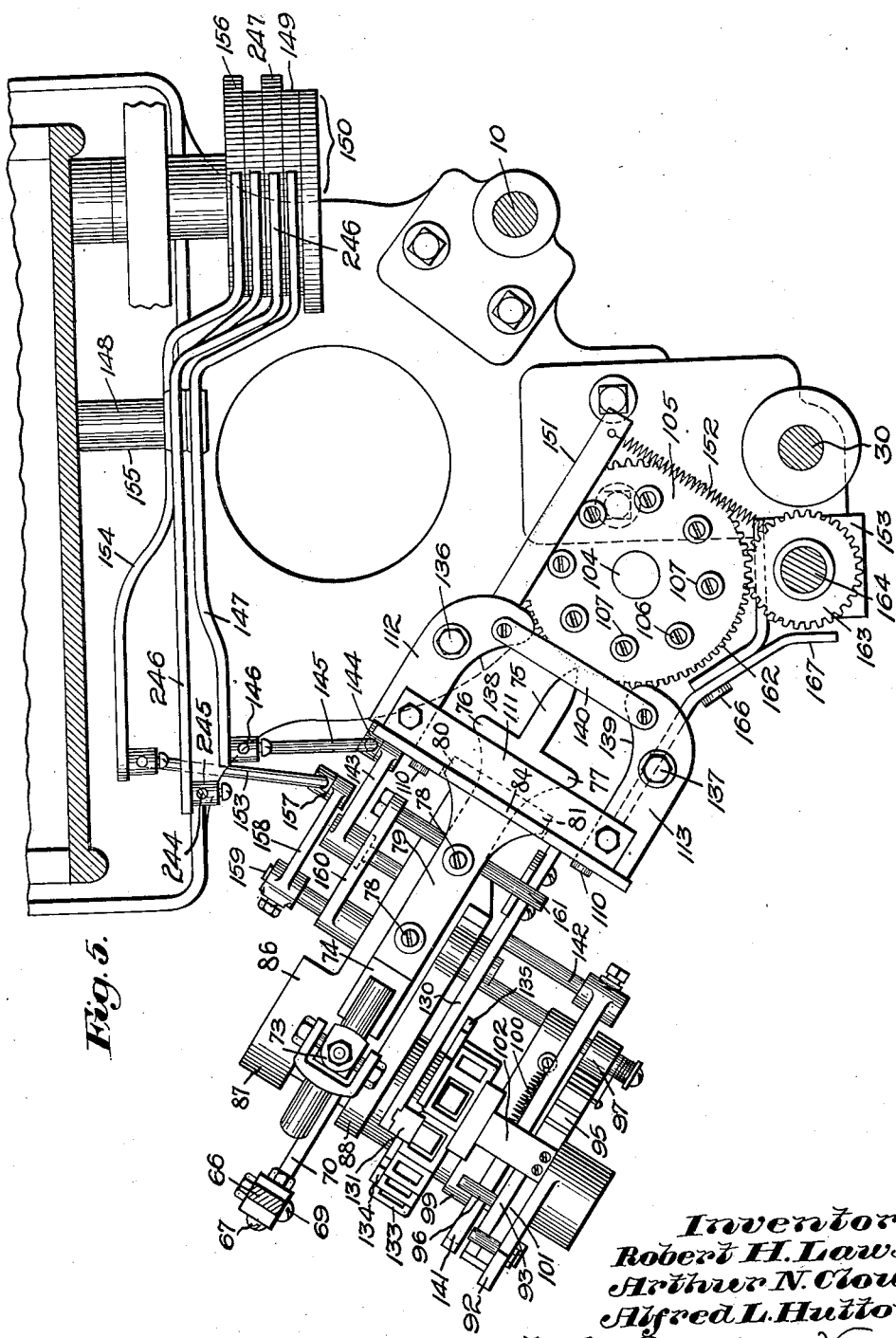

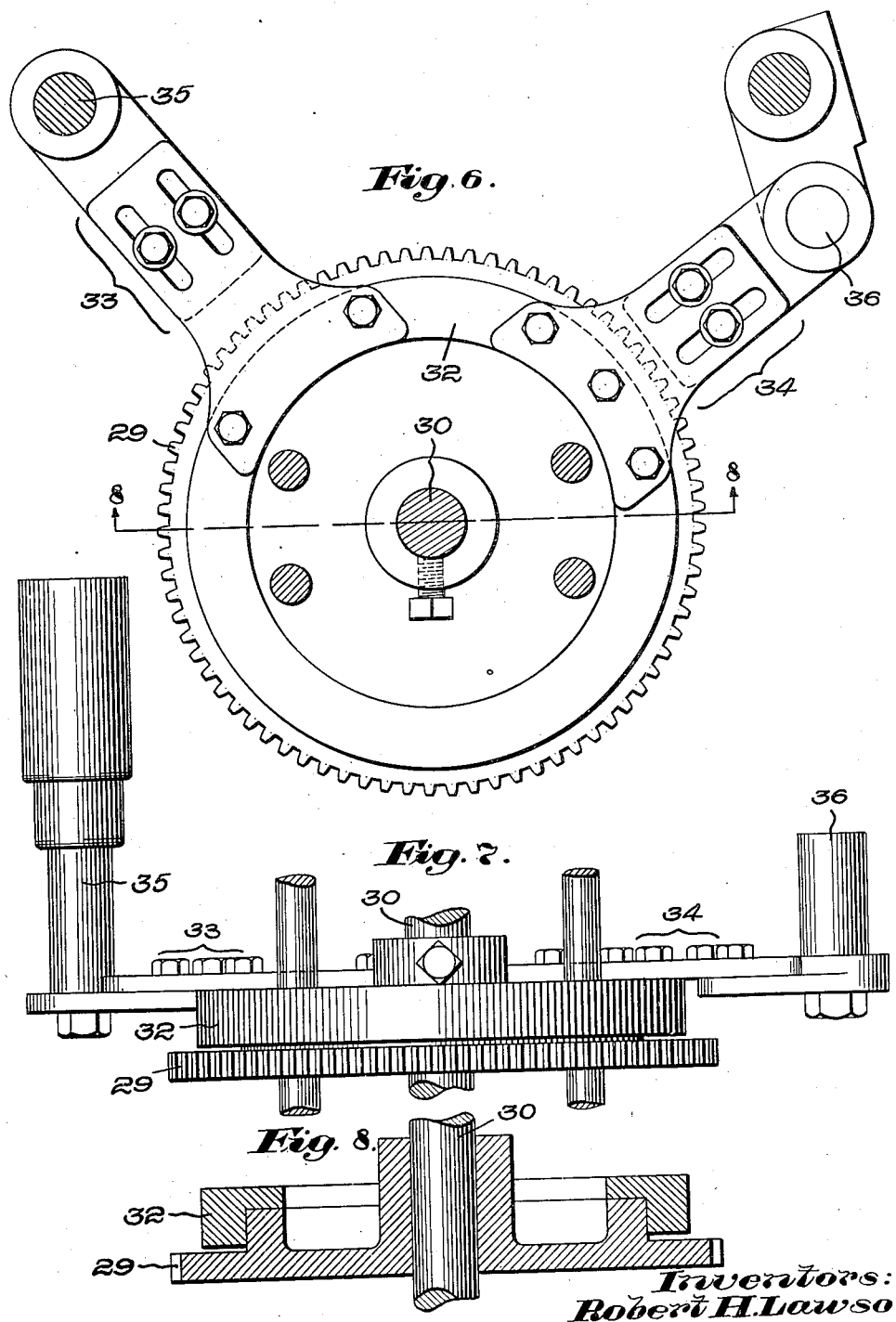

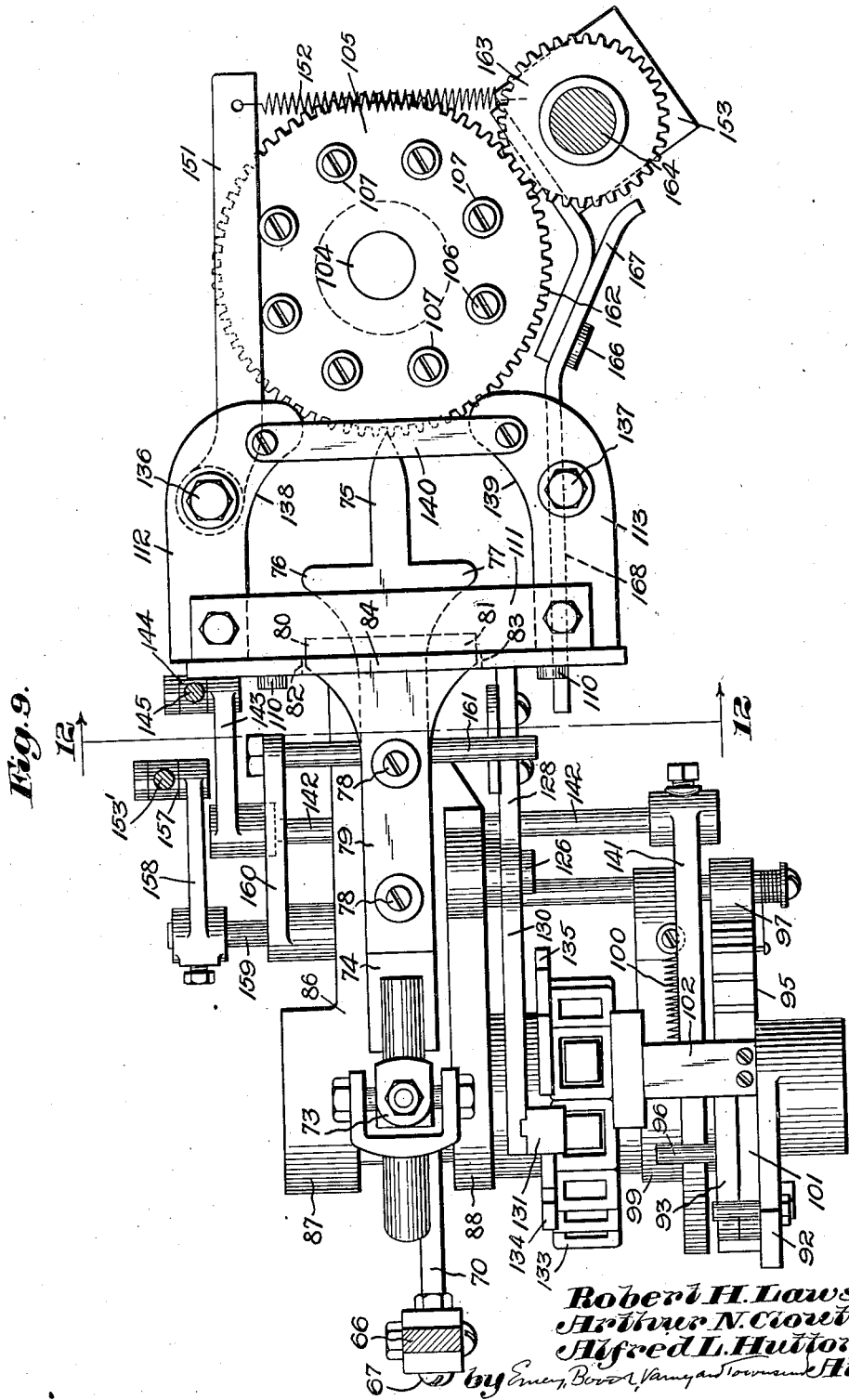

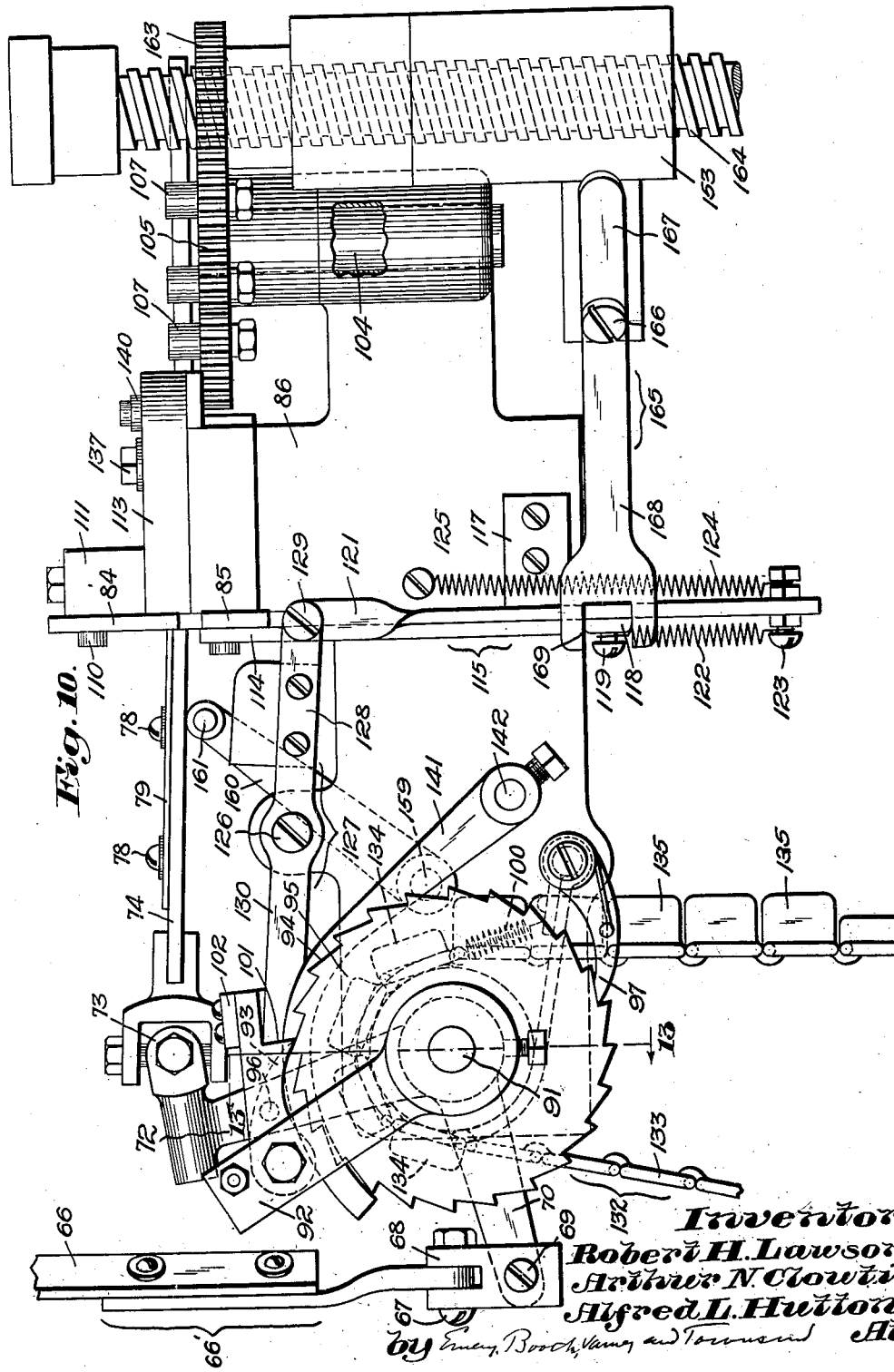

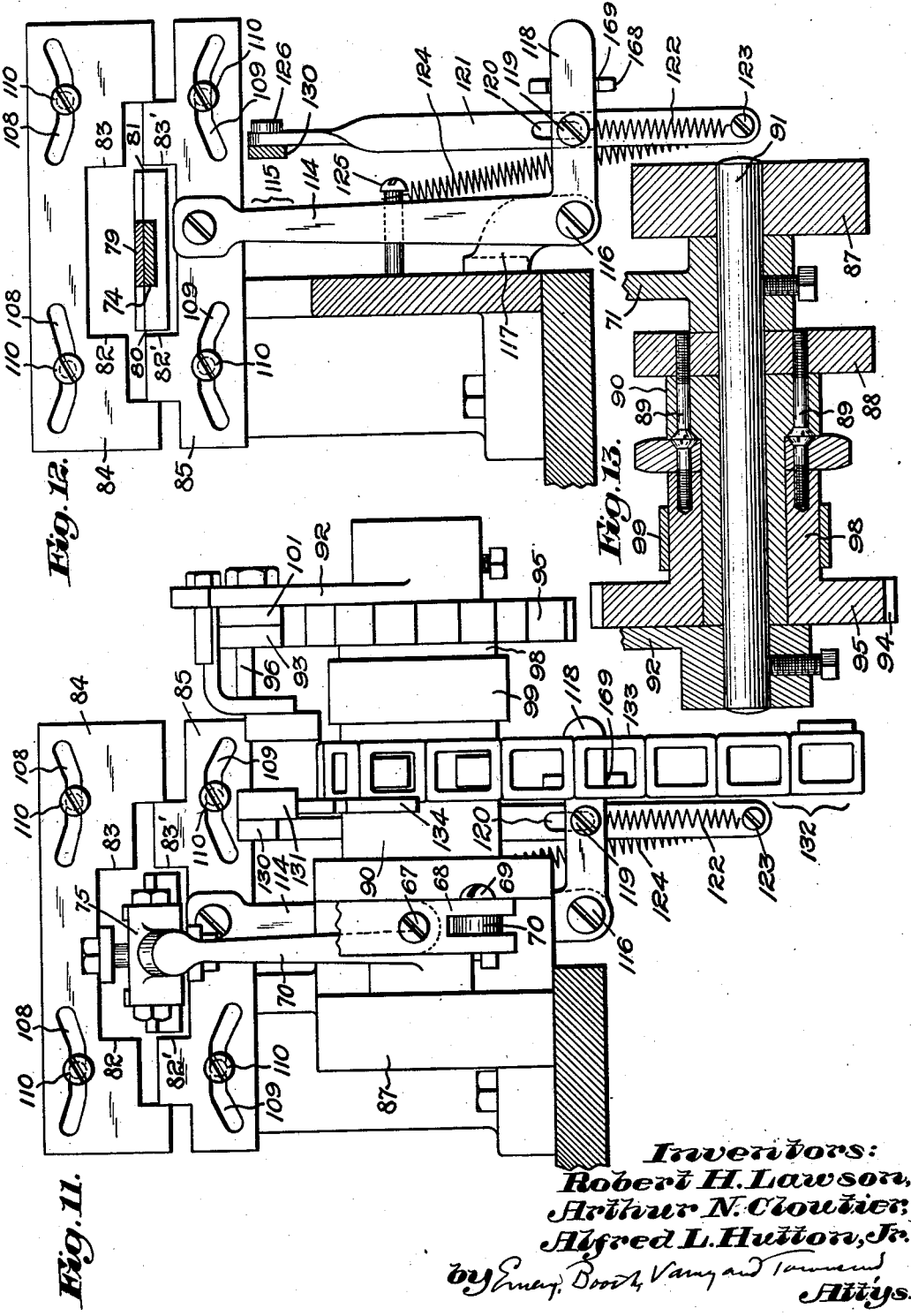

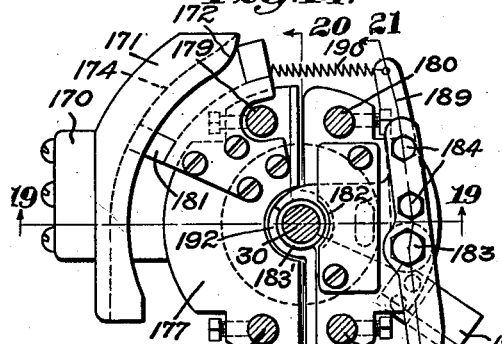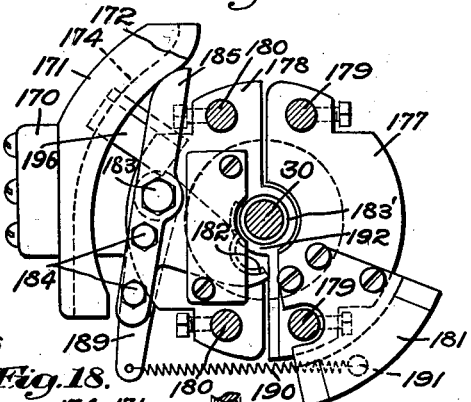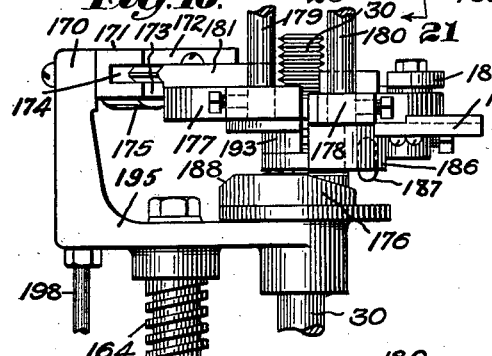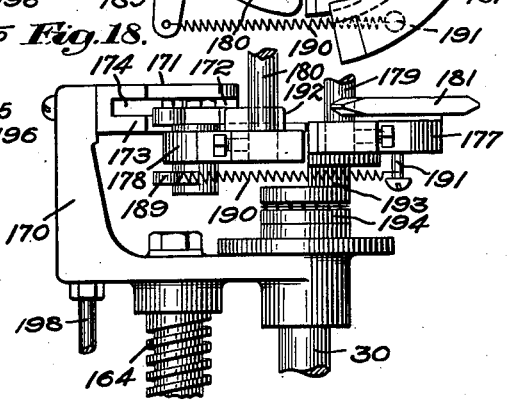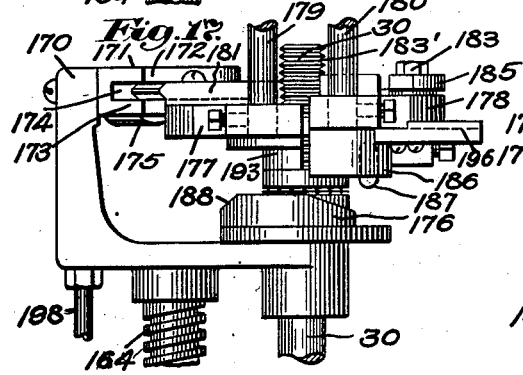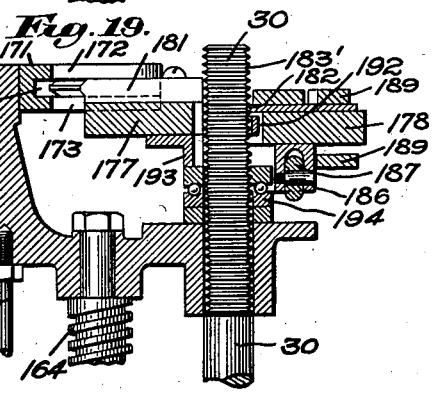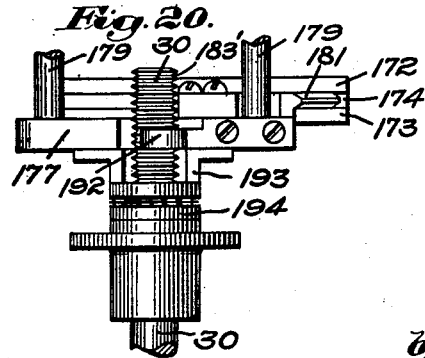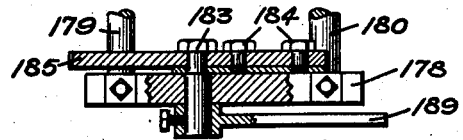

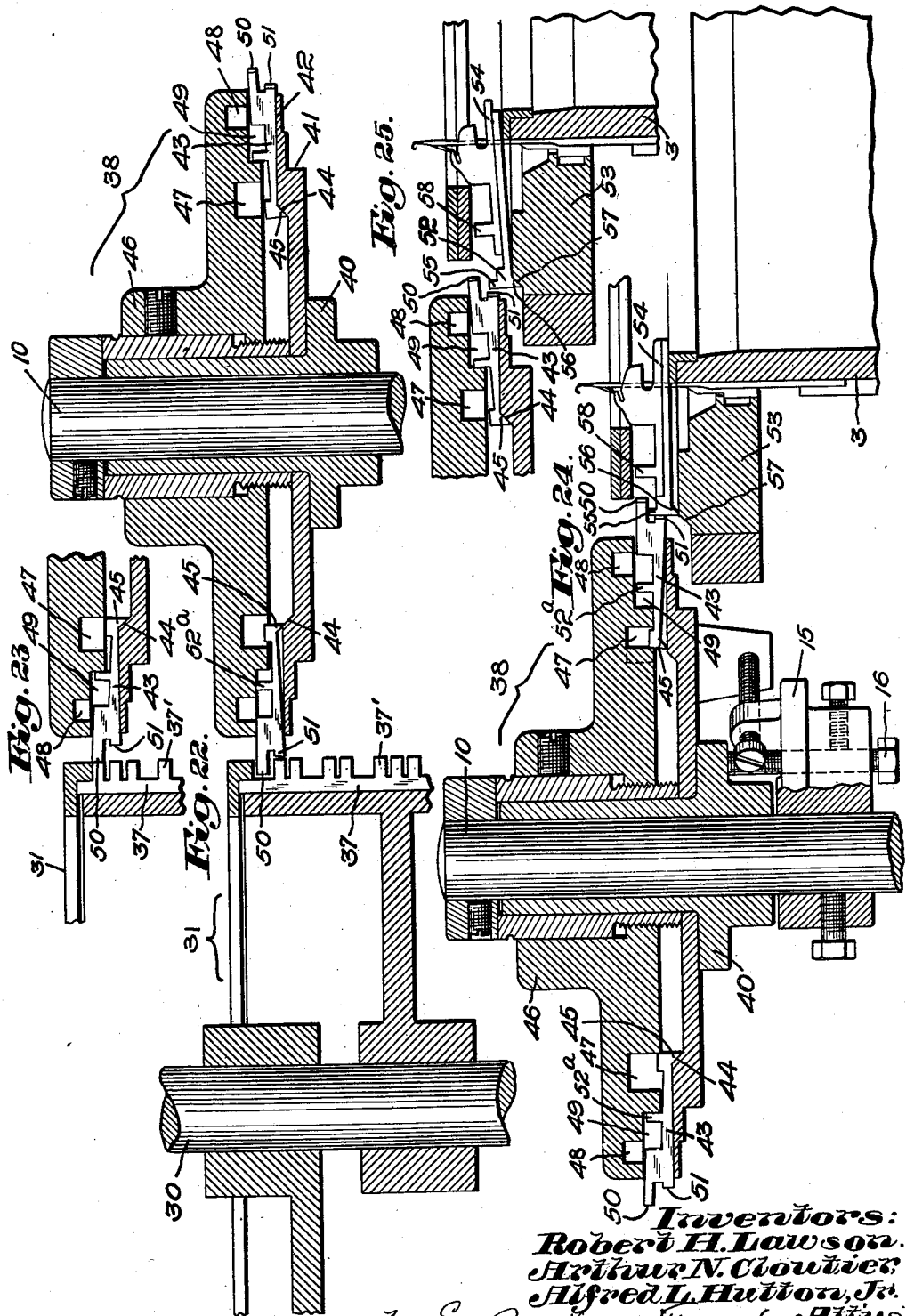

Feb. 11, 1936.  R. H. LAWSON ET AL  2,030,516
JACQUARD PATTERN MECHANISM FOR KNITTING MACHINES
AND METHOD OF PATTERNING EFFECTED THEREBY
Filed Jan. 2, 1932  13 Sheets-Sheet 12
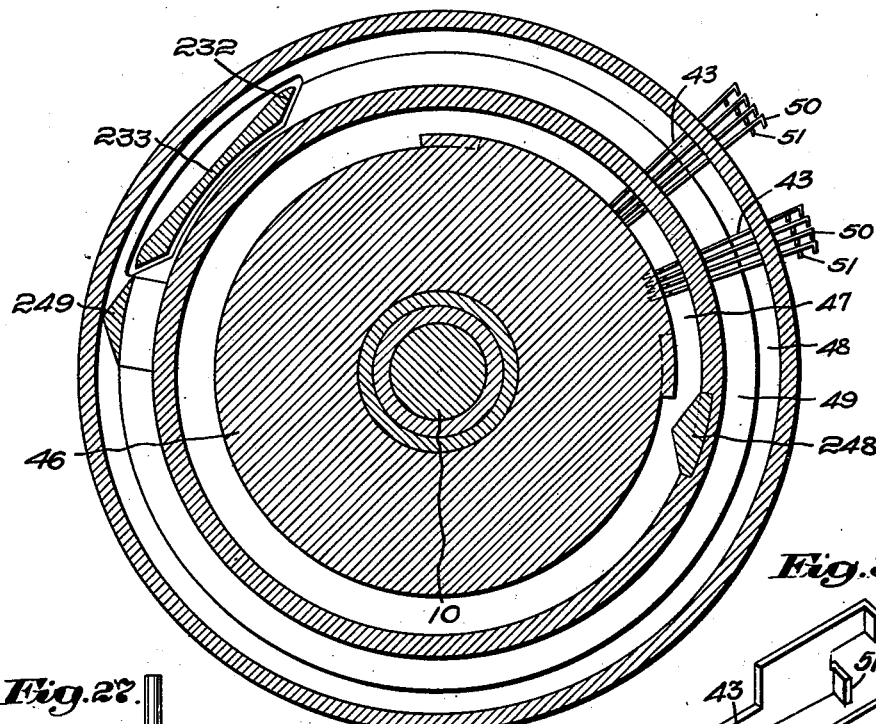
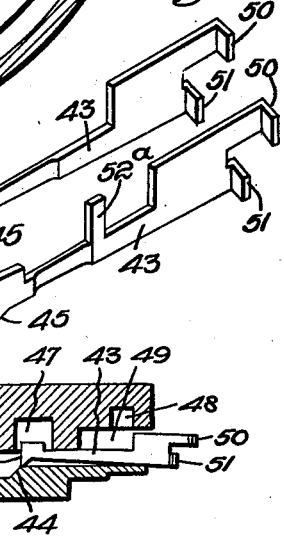
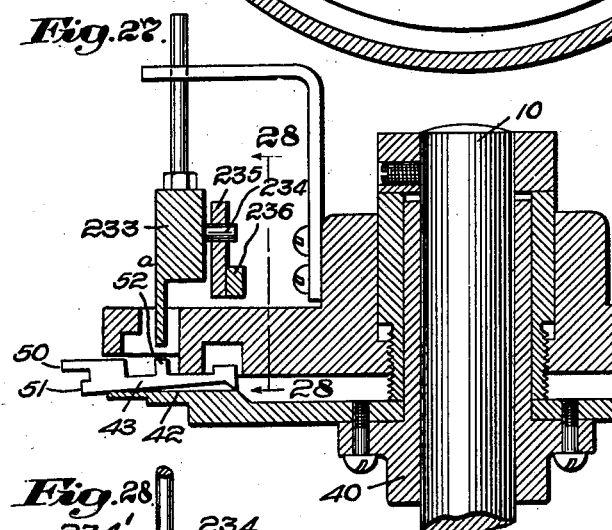
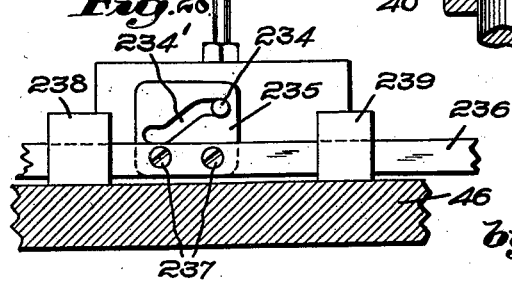
Inventor:
Robert H. Lawson,
Arthur N. Cloutier,
Alfred L. Hutton, Jr.
by Emery, Booth, Varney and Townsend
Attys.

Feb. 11, 1936.  R. H. LAWSON ET AL  2,030,516
JACQUARD PATTERN MECHANISM FOR KNITTING MACHINES
AND METHOD OF PATTERNING EFFECTED THEREBY
Filed Jan. 2, 1932  13 Sheets-Sheet 13
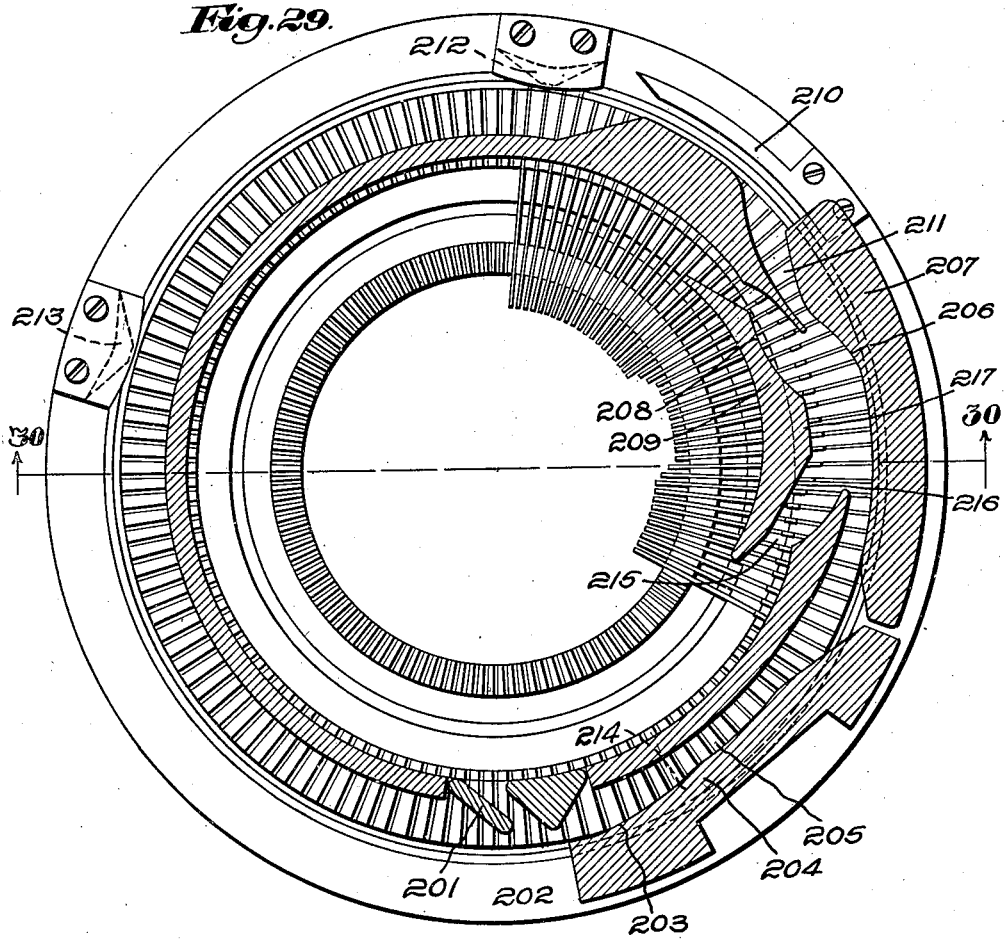
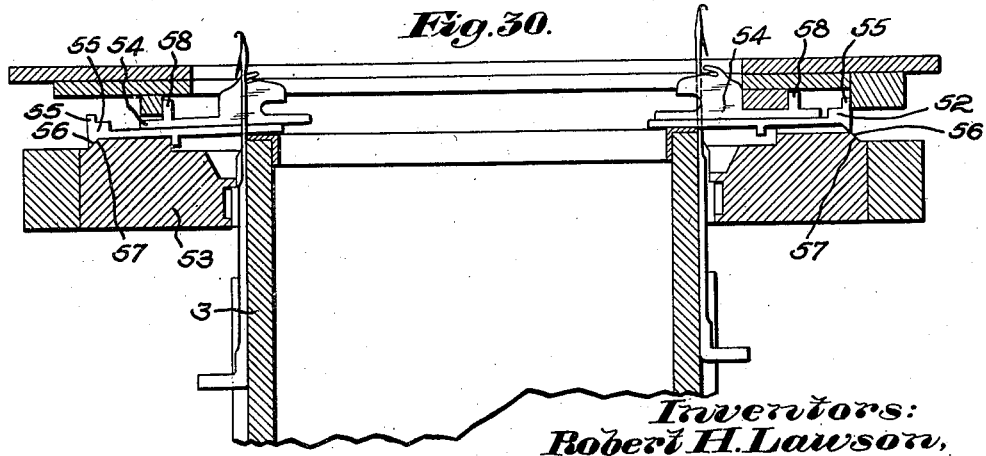
Inventors:
Robert H. Lawson,
Arthur N. Cloutier,
Alfred L. Hutton, Jr.
by Emery, Booth, Varney and Townsend Attys.

Patented Feb. 11, 1936

2,030,516

UNITED STATES PATENT OFFICE 2,030,516

JACQUARD PATTERN MECHANISM FOR KNITTING MACHINES AND METHOD OF PATTERNING EFFECTED THEREBY

Robert H. Lawson, Pawtucket, and Arthur N. Cloutier and Alfred L. Hutton, Jr., Lonsdale, R. I., assignors to Hemphill Company, Pawtucket, R. I., a corporation of Massachusetts Application January 2, 1932, Serial No. 584,380

40 Claims. (Cl. 66—50)

This invention relates to jacquard pattern mechanism for knitting machines as well as to the method of patterning effected thereby.

In order that the principle of the invention may be readily understood, we have disclosed a single embodiment of the mechanism of our invention in the accompanying drawings wherein:—

Fig. 1 is a front elevation of the entire mechanism, excepting the driving pulleys and immediately associated parts;

Fig. 2 is a left-hand elevation thereof;

Fig. 3 is a rear elevation thereof;

Fig. 4 is a plan view thereof;

Fig. 4a is an enlarged detail of parts shown in Fig. 4;

Fig. 4b is a side elevation of the structure shown in Fig. 4a;

Fig. 5 is a plan view on line 5—5 of Fig. 2, showing the pattern chain mechanism and controlling parts for controlling the axial movements of the jacquard or selector drum;

Fig. 6 is a horizontal section on line 6—6 of Fig. 2;

Fig. 7 is an end elevation of the structure shown in Fig. 6;

Fig. 8 is a section on line 8—8 of Fig. 6;

Fig. 9 is a plan view of the pattern chain mechanism;

Fig. 10 is a side elevation of the structure shown in Fig. 9;

Fig. 11 is a left-hand elevation of the structure shown in Fig. 9;

Fig. 12 is a section on line 12—12 of Fig. 9;

Fig. 13 is a section on line 13—13 of Fig. 10;

Fig. 14 is a plan view of the mechanism for raising or lowering each half of jacquard drum;

Fig. 15 is a view similar to Fig. 14, but with the parts in another position;

Fig. 16 is an end elevation of the structure shown in Fig. 14 with the parts in position for raising the jacquard or selector drum;

Fig. 17 is an end elevation of the structure shown in Fig. 14 with the parts in position for lowering the jacquard or selector drum;

Fig. 18 is a side elevation of the structure shown in Fig. 15;

Fig. 19 is a section on line 19—19 of Fig. 14;

Fig. 20 is an inside view on the line 20—20 of Fig. 14;

Fig. 21 is a section on line 21—21 of Fig. 14;

Fig. 22 is a section through the jacquard or selector drum and dial;

Fig. 23 is a view similar to part of Fig. 22 and showing a dial jack as being selected by a jacquard strip;

Fig. 24 is a section through the dial, sinker ring and part of the needle cylinder and showing jacks and sinkers in reverse plating position;

Fig. 25 is a view similar to part of Fig. 24, but showing jacks and sinkers in normal plating position;

Fig. 26 is a horizontal section of the dial;

Fig. 27 is a vertical section of the dial taken on the line 27—27 of Fig. 4;

Fig. 28 is a section on the line 28—28 of Fig. 27;

Fig. 29 is a horizontal section of sinker ring and cams;

Fig. 30 is a section on the line 30—30 of Fig. 29;

Fig. 31 is a perspective view of the dial jacks.

The mechanism and process of our invention constitute an improvement upon the co-pending applications of Lawson and Lawson, Serial Nos. 177,262 and 182,060. In said co-pending applications the smallest number of sinkers there shown as selected at any one time is two, whereas in accordance with the mechanism herein disclosed, a single sinker at a time may be controlled for normal or reverse plating. For the purpose of changing patterns it is necessary only to change the jacquard pattern chain and the strips in the jacquard or selector drum.

While the jacquard patterning mechanism herein disclosed may be employed in connection with other types of knitting machines than that herein indicated, we have selected for illustration a circular hosiery knitting machine such, for example, as the general type known as the Banner and disclosed originally in the patent to Hemphill No. 933,443. The patterning may be effected by any desired or suitable stitch structural variation that is within the scope of the invention, as, for example, plating or reverse plating, and without limiting our invention thereto, we have herein shown only means for effecting patterning through plating and reverse plating. To effect plating and reverse plating we preferably employ sinkers or instrumentalities which directly engage the yarns or threads for the purpose of causing changes in the plating relation thereof, but our invention is not limited to the effecting of normal and reverse plating through direct sinker control as we may otherwise effect the same. For the purpose of this application but without limiting ourselves thereto, we have shown or indicated that means for effecting reverse plating wherein sinkers directly engage the yarns or threads for the purpose of effecting changes in the plating relation of the yarns or threads. To that end we preferably employ the principles of operation disclosed in the patents to Robert H.

Lawson No. 1,605,896 and Reissue No. 16,584, and the following subsequent patents to Robert H. Lawson either as a sole or joint inventor: 1,627,290, May 3, 1927; 1,690,076, October 30, 1928; 1,716,450, June 11, 1929; 1,720,649, July 9, 1929; 1,735,970, November 19, 1929; 1,758,899, May 13, 1930; 1,785,200, December 16, 1930; 1,790,623, January 27, 1931; 1,796,266, March 10, 1931; 1,801,606, April 21, 1931; 1,801,607, April 21, 1931; 1,806,299, May 19, 1931; 1,897,130, February 14, 1933. We refer to those patents for a full disclosure of special instrumentalities and regular web holders, one of each of which is positioned in the grooves of the sinker ring, although it is to be understood that we may and preferably do employ a special instrumentality in each sinker groove. Relative movement of the needles and the said instrumentalities, and preferably movement of said instrumentalities transversely of the needle series, effects yarn or thread engagement thereby in such a manner that two plating yarns or threads which are fed in a plating relation are thereby reversed in position, desirably during the loop forming operation, as disclosed in said patents, and to which we refer for a more complete description.

Preferably we employ upon a vertical spindle a single dial disk of the general character shown in the said co-pending applications of Lawson and Lawson and provide in said dial disk jacks which are movable into and out of operative position so as individually to control the positions of the sinkers or like instrumentalities which directly engage the yarns or threads to effect reverse plating.

As disclosed in said applications, a jacquard drum is provided in the lengthwise extending grooves whereof are thin steel jacquard strips having butts all extending from the same edge in the plane of the body of the strips. Desirably those strips are originally identically made and the butts not required for the pattern are removed as by breaking them off in accordance with well known shop practice. The drum controls changes from plating to reverse plating throughout a very extended number of courses, and at each and every loop or stitch throughout said courses regardless of or without depending upon what has been done or is to be done at any other loops or stitches. As herein disclosed the jacquard drum or member is of such height or length as to control forty-eight consecutive courses, or other desired number, assuming that the jacquard drum is racked continuously in one direction, one step for each course. If desired, the drum need not be racked every course, or, if desired, at the end of a racking movement in one direction it may be correspondingly racked in the opposite direction. This enables us to provide for the making of figures of various sizes, or of pictures, names, letters, numerals or other representations throughout a very extensive part of the stocking.

Referring to the parts of the mechanism which may be similar to that shown in said co-pending applications and referring first to Fig. 1, the latch ring is indicated at 1. Said latch ring has supported therein a group of pivoted yarn or thread fingers indicated generally at 2 and including two separate yarn or thread fingers through which respectively two yarns are introduced in plating relation, indicated most clearly in Fig. 30 of the reissue patent to Robert H. Lawson, No. 16,584, and which therefore need not be more particularly referred to.

The machine, being of the so-called Banner type, is provided with a rotating needle cylinder 3 about which are mounted the usual knitting or needle controlling cams, pickers, etc., not necessary to describe in detail as they are shown in numerous patents.

The machine is provided, as shown in Fig. 1, with a pattern shaft 4 upon which is mounted the usual pattern drum 5 having circumferentially arranged and secured removably thereon a series of cams for controlling the yarn fingers through the usual operating levers, indicated in part at 6 in Fig. 1.

The said cam shaft 4 is also provided with other formations or members indicated generally at 7 by which other parts are controlled, among them being pawls or levers by which a pattern chain mechanism is operated, which in turn governs the axial movement of the jacquard or selector drum.

As shown in Fig. 1 the needle cylinder has fast thereon a gear 8 meshing with a gear 9 on the upright shaft 10 which itself is supported in bearings 11, 12 fastened to the needle cylinder bed 13 and the bed plate 14 of the machine. At its upper end the needle cylinder is provided with a web holder or sinker bed ring indicated generally at 14a, which will be more fully described.

Near its upper end the upright shaft 10 has fast thereon an arm 15 shown in Fig. 2. The said arm carries an adjusting screw 16 that supports the jack dial, hereinafter to be described, for regulating the height of the jack dial with relation to the sinker head. Also adjusting screws 17, 18 in the lugs 19, 20 engage a lug 21 on the under side of the dial for circumferential adjustment of the dial jacks with the sinker jacks.

An arm 22 fast to the shaft 10 supports a gear 23 loosely mounted on said shaft. Adjusting screws 24, 25 in the lugs 26, 27 on the arm 22 engage a lug 28 on the under side of the gear 23 for regulating the dial jacks with respect to the butts that are formed on the strips of the jacquard drum. The said gear 23 meshes with a gear 29 fast on the threaded shaft 30 and carrying the jacquard drum 31. The said jacquard drum is desirably of the same general construction as that shown in the said co-pending applications. It is provided throughout its circumference with lengthwise grooves desirably equal in number to the number of needles in the knitting machine, and therefore equal in number to the number of sinkers or like instrumentalities in the sinker ring mechanism.

Upon the upper side of the gear 29 is a housing 32 supported by adjustable brackets 33, 34 shown most clearly in Figs. 6 and 7. The bracket 33 is supported by an upright shaft 35 in a bearing mounted on the upper side of the cylinder bed 13 of the machine as shown in Fig. 3. The bracket 34 is supported by a stud 36 in the bracket, of which bearing 11 forms a part, on the under side of the cylinder bed as shown in Fig. 1. The said brackets 33, 34 are adjustable for the various sizes of cylinder.

The jacquard or selector drum 31 is provided in the respective lengthwise grooves thereof with removable strips 37, a portion of one of which is shown in Fig. 22. The said strips are of thin steel and in the making thereof all the strips are provided at one edge with the same number of butts, as, for example, forty-eight. The number of butts depends, of course, upon the length of the cylinder or drum. Those butts which are not needed by the pattern to be set up on the drum are removed before the strips are put in the grooves of the drum, and the strips can be readily removed from the drum by removing the end caps of the drum which hold the strips in position. The butts not needed by the pattern are removed from the strips by breaking them off or knocking them off in accordance with well known shop practice. In Fig. 22, we have indicated that a few of the butts have been removed in accordance with shop practice.

We have stated that the mechanism herein disclosed is particularly adapted for single sinker control. In the said co-pending applications of Lawson and Lawson there is shown mechanism whereby reverse plating is effected on two adjacent sinkers at a time. In the disclosure in said applications the smallest number of sinkers there shown as adapted to be pushed in for pattern groups is two sinkers, whereas in the present disclosure we select by the herein disclosed mechanism any one single sinker or any greater number of sinkers, as desired, for pattern purposes. In making the pattern, it is not necessary to change any of the sinkers or the sinker jacks or the dial jacks. It is necessary only to change the jacquard chain to be hereinafter referred to, but which may be generally like that shown in application Serial No. 182,060, and to change the jacquard strips. The said jacquard strips 37 are desirably a little shorter with respect to the height of their butts than as shown in said co-pending application, the reason being that there is a smaller or shorter movement of the dial jacks. Therefore it is necessary only for the jacquard strip butt 37' to have a height called for by the smaller movement necessary for selective purposes.

In association with the jacquard drum 31 and its strips 37, there is provided a dial generally indicated at 38 mounted upon the upright shaft 10 as clearly shown in Fig. 22. The said dial shaft above the collar 40 has a dial plate 41 radially grooved as indicated at 42 for the reception of selector or dial jacks generally indicated at 43. Radially inside of the grooves for the selector jacks 43 there is a downwardly inclined or beveled annular or ring-like surface 44 and the inner ends of the jacks are each provided with a correspondingly beveled end 45 which may ride upon the inclined bevel formation 44 as indicated clearly in Fig. 22. Above the dial plate 41 is a dial cap 46 having thereon circumferential grooves indicated at 47, 48 and a recessed portion 49 clearly shown in Figs. 22, 24 and 25.

When in any course of the fabric a butt exists upon a jacquard strip to control the stitch on the corresponding needle, the said retained butt of the jacquard strip pushes the dial or selector jack 43 radially inward to its inner or back position toward the center of the dial, thereby rendering it temporarily inoperative or non-functioning. This is done through the engagement of the referred to butt on the jacquard strip with the upper longer projection or nib 50 on the said dial or selector jack. Each dial or selector jack 43 is provided with the upper, longer nib or projection 50 and a lower shorter nib or projection 51. If a butt has been removed from the illustrated jacquard strip 37 and knitting is being done at the height corresponding to the position of the lacking butt, the dial or selector jack 43 corresponding thereto remains in its outer position, so that in the rotation of the dial 38 it acts upon the corresponding sinker head jack 52 shown clearly in Fig. 25 and one of which is provided in each sinker groove of the sinker head 53. The structure of these sinker head jacks will be hereinafter more fully referred to. By the described action of a dial or selector jack 43 upon a sinker head jack 52 the said sinker head jack is placed in its radially inner position for reverse plating in that it acts upon its corresponding sinker jack 52 as shown in Fig. 24. Each said sinker head jack 52 is provided with an upwardly extending nib 55 adapted to be engaged by the lower nib 51 of the dial or selector jack 43, and is also provided with a beveled downwardly extending projection 56 which is adapted to engage and slide down the beveled annular surface 57 as indicated most clearly in Fig. 25. When there is an indication for reverse plating and the dial or selector jack 43 has been moved outward as shown in Fig. 24, the lower nib or projection 51 thereof engages the outer end of the sinker head jack 52 and slides the same radially inward of the sinker ring so that the beveled projection 56 rides up the slope 57 and so elevates the sinker 54 supported upon the jack in the same groove that the butt 58 of the sinker 54 is brought into position to engage a fixed cam upon the sinker cam ring and thereby the sinker is forced into its inner position at the proper time to effect reverse plating in a manner fully disclosed in Patents 1,872,596, Aug. 16, 1932; 1,872,597, Aug. 16, 1932; 1,872,598, Aug. 16, 1932. If, however, the dial or selector jack does not act upon the sinker head jack 43, the latter remains in its depressed position and the sinker 54 effects normal plating because it remains in the position indicated in Fig. 25.

As stated, the upper nib 50 of each dial or selector jack is selected by the appropriate butt upon the jacquard strip and the lower nib 51 operates the appropriate sinker or sinker head jack. The purpose in having two nibs on each dial or selector jack is to permit a very short movement of the dial or selector jacks 43 while being selected, and in order that the said dial jacks will each have to make only a short movement in placing the corresponding sinker or sinker head jack in its inner position for reverse plating. Heretofore the butts on the jacquard strips were so long that in order to give each dial jack the required movement, a dial jack was provided with a nib long enough to act upon an equivalent two sinker jacks. By the construction disclosed in the present application and by the provision of the upper and lower nibs upon the dial or selector jacks we are able to provide for and secure a very short movement of the dial or selector jacks and consequently of the sinker head jacks. By reason of the construction disclosed herein any jacquard butt is enabled to push a dial or selector jack in and the said jacquard strip butt will entirely clear both the last previous and the next following dial or selector jacks. The movement herein employed is so short that the lower nib 51 pushes in a sinker jack to its inner position and clears the last previous and the next following sinker jacks owing to the fact of the described small movement. An important purpose of the invention is to provide means whereby either a single sinker or any group of sinkers or all the sinkers at the knitting head may be selected as desired. Owing to the disclosed size of the jacquard strip butts no jacquard strip gains more than a trifling amount over a dial or selector jack 43, the diameters of the outer ends of the jacquard strip butts being substantially equal to the half-way position of the lower nib on a sinker or dial jack. The movement of each sinker jack is so small that each butt of a jacquard strip acts only upon a single dial or selector jack and misses the last previous and the next following selector jack. The provision of a single nib upon a dial or selector jack to be acted upon by a butt on a jacquard strip and the provision of a second nib for the selection and actuation of the corresponding sinker or sinker head jack is an important feature of the invention.

The jacquard or selector drum is raised and lowered by the use of mechanism similar to and constituting an improvement upon which is shown in the patent to Robert H. Lawson, No. 1,778,901, Oct. 21, 1930. The particular means constituting an improvement upon the mechanism shown in that patent will be referred to in detail hereinafter.

The dial or selector jacks 43, as already stated, are selected by the butts of the jacquard strips and accordingly are positioned in their inner or inoperative relation, as shown in Fig. 23, so that they do not come in contact with the sinker jacks 52. Where the butts of a jacquard strip are broken off or otherwise removed, the dial or selector jack is left in its outer position, as shown in Fig. 22, so that it will come in contact with the sinker jack 43 and push the same to its inner position for reverse plating, see Fig. 24. When the dial or selector jack is in its inner position and therefore inoperative or non-functioning, it is sunk and held by the dial cams out of action. When the dial or selector jack is left in its outer position, it is held firmly against the dial cam while it is pushing the sinker jacks to their inner position.

As set forth more in detail hereinafter, there is provided in the proper circumferential position a stationary cam attached to the dial disk for pulling all jacks back ready to be selected over again by the selector jacks. A movable switch cam is also employed for the purpose of providing for the making of a plain sole, the said cam being movable from an upper to a lower position and vice versa.

The dial or selector jacks are provided with intermediate butts 52ª shown most clearly in Figs. 22, 23, 24 and 25 which come in contact with the said switch cam and the dial or selector jacks are thereby moved to their inner position and sunk so as to be inoperative. Those dial or selector jacks not needing the said butt 52ª have such butts removed therefrom as by breaking or otherwise and such jacks therefore clear the said cam and either stay at their inner or outer position as already selected by the butts of the jacquard strip 37 for reverse plating, in the instep or upper part of the foot.

The sinker jacks 52 are not strictly speaking selected by the dial or selector jacks; they stay in their outer position and are sunk by the cam for that purpose. Such jacks are inoperative for the time being. The sinker jacks that are selected and accordingly moved to their inner position travel circumferentially about with the dial and push the corresponding sinkers 54 in by coming in contact with the reverse plating cam at the proper time, such cam being of the character set forth in Patents 1,872,596, 1,872,597, 1,872,598 hereinbefore referred to, disclosing the effecting of normal and reverse plating.

In addition, cams are employed for stopping the sinkers jacks from flying or moving out of position when being brought to their outer position by the rear side sinker cams. There is also a guard cam extending along the back of the rear side sinker cams, for the purpose of steadying the sinker jacks in their outer position. There are also provided two cams for the purpose of making certain that the sinker jacks are all sunk until selected in the next course from the dial jacks.

The sinker jacks 52 and the dial or selector jacks 43 are both milled and are bent to provide friction, since friction is relied upon to hold both of said types of jacks to their inner or their outer positions as selected.

A stationary sinker jack cam is also provided to even the sinker jacks to their inner position after being selected by the dial jacks.

The switch cam is out of action during the knitting of the leg and the foot but is in action when changing into the heel and the toe. All the selector jacks are pushed to their inner position while making the change into the heel and toe, the sinker jacks being brought to their outer position and sunk. The sinker jacks are in operation only when required for reverse plating.

We will next describe the means for imparting rotary and axial movements to the jacquard drum or cylinder 30. While any suitable means may be employed for this purpose, we preferably employ means similar to that shown in, but constituting an improvement upon the mechanism of, the patent to Robert H. Lawson, No. 1,788,901, dated October 21, 1930. Reference is made to that patent for a disclosure of the general type of mechanism employed herein.

Referring more particularly to Figs. 3, and 9 to 13 inclusive, of this application, and first to Fig. 3, the so-called "104" gear of the knitting machine is represented at 59. The said gear, provided with 104 teeth, rotates once to every four revolutions of the needle cylinder. Meshing with the said "104" gear 59 is a pinion 60 having 26 teeth, so that the pinion 60 rotates once to each revolution of the needle cylinder. Said pinion 60 is mounted on a shaft 61 in bearings 62 provided with suitable brackets on the frame of the machine, and a sleeve 63 surrounds a portion of said shaft 61. Upon the inner end of the shaft 61 is fastened crank disk 64 and pivotally connected thereto at 65 is a connecting rod 66 having a lengthwise adjustable portion 66', as shown most clearly in Fig. 10. The lower end of said connecting rod is pivotally connected at 67 to a short link or block 68 which is pivoted at 69 to the arm 70 of a bell crank lever 71 (see Fig. 3), the other arm 72 whereof is connected by a universal joint 73 to the end of a to-and-fro movable element or dagger 74. Said element or dagger 74 is provided with a pointed or arrow-shaped end 75 and in the rear thereof with opposite lateral projections 76, 77, the function whereof will be hereinafter described. Formed, if desired, with said element or dagger 74, but in the present instance shown as secured thereto by bolts 78, is an overlying part 79 relatively broad compared with the pointed or arrow-shaped end 75. The sides 80, 81 of the overlying part 79 are adapted to be engaged by the inner edges 82, 82', 83, 83' of the upper guide 84 and the lower guide 85 to be referred to more particularly hereinafter.

The bell crank lever 71 is fast upon a short shaft suitably mounted in the framing or casting 86. For this purpose, there is provided a two-part bearing shown at 87, 88 in Figs. 9 and 13. Secured by bolts 89 to the bearing part 88 is a sleeve 90 through which the shaft 91 extends and wherein it is rotatable. Fast upon the shaft 91 is an arm or lever 92 which, as shown in dotted lines in Fig. 10, is provided with a pawl 93 of usual shape and adapted to engage the teeth 94 of a ratchet 95 that is free to rotate upon the sleeve 90. The pawl 93 is provided with a laterally extending pin 96, the function of which will be hereinafter stated. A hold-back pawl 97 is preferably provided as shown in Fig. 10.

The hub 98 of the ratchet 95 is surrounded by a brake band 99, shown also in Figs. 9 and 10, and the ends whereof are suitably connected by a spring 100. At the side of the pawl 93, shown also in Fig. 9, is a second pawl 101, a cross piece 102 whereof is engaged by the pawl 93 when lifted out of action by means hereinafter described, so as to lift said second pawl also out of engagement with the ratchet 95. The lifting of said pawls out of engagement with the ratchet may occur at predetermined times in accordance with the requirements or conditions of the mechanism to which our invention is applied.

Fast in the frame or casting 86 is an upright stud 104, shown most clearly in Fig. 10. Free to turn in either direction with said stud is a toothed disk 105 which will be referred to as the rotatory member, and, which in accordance with our invention, the to-and-fro movable element or dagger 74 turns in either direction in accordance with the dictates of the controlling parts. Extending from the upper face of the rotatory member or disk 105 is a series of pins or bolts 106, here shown as eight in number, and each carrying a small roller 107 to reduce wear. The said pins 106 are equally distributed about the face of the disk 105. Viewing Fig. 9, it will be evident that so long as the element or dagger 74 reciprocates or moves to and fro in a line which intersects the axis of rotation of the disk 105 (that is, the shaft 104 or axis thereof) the disk 105 is not turned in either direction. If, however, said element or dagger 74 is moved laterally to one side or the other of the axis of rotation of the disk 105, the continued movement of the element or dagger 74 imparts a step-by-step movement to the disk 105 in a clockwise direction or in a contraclockwise direction, according to the side of the axis of the disk 105 to which the said element or dagger 74 has been shifted.

In order to shift the dagger 74 transversely the upper and lower guides 84 and 85 are used. These guides, as shown most clearly in Figs. 11 and 12, are provided with cam-shaped slots 108, 109, through which screws 110 extend into a bracket 111 mounted on the upper side of two brackets 112, 113. Suitably secured to the lower guide 85 is the arm 114 of a bell crank lever 115 pivoted at 116 upon a bracket 117 secured to the framing. These guides 84, 85 move from one side to the other, moving the dagger 74 to one side to raise the drum 31, and to the other side to lower the said drum 31. When the dagger 74 is in its center position, it is operated between two rollers on the gear 105, as shown in Fig. 9, and it does not then move the selector drum 31 either up or down. These guides 84, 85 guide the dagger 74 to its various positions, namely, either to one side or the other or to its central position. The slots 108, 109 are arranged in said guides 84, 85, so that when the dagger 74 is to one side or the other, there is no possible chance of it being caught and getting out of place. As said guides 84, 85 are pushed from one side to the other, they close in a vertical position due to the construction of the slots 108, 109, as already described, holding the dagger safely to either side selected.

Moreover said guides 84, 85 are arranged so as to hold the dagger 74 perfectly central, when required, in between two adjacent rollers on the operating gear 105. In the earlier construction, upon which this is an improvement, there was provided merely a plain guide with a horizontal slot moving the dagger from one side to the other, there being no guide across the upper part of the dagger. In said prior construction, after changing out of the heel and toe, the dagger very often would be on one side or the other, and the pin that is underneath it, which held the dagger out of action while making the heel and toe, would drop the dagger on top of said guide and either cause a smash or cause the missing of a needed course. In accordance with the new construction providing upper and lower guides, whether the dagger is at one side or the other, acting to turn the drum, or whether the dagger is raised up in the heel and toe (so that it cannot work on the rolls on the operating gear 105, and it is on one side or the other, the guides 84, 85 are closed together so that the dagger 74 must drop back into its correct position, whether it be in a center position or to either side as desired, according to the pattern chain. After changing out of the heel, the dagger 74 has to follow the guides 84, 85, as indicated in Figs. 11 and 12, where it is shown as being central, and it will be seen that the dagger will have to stay central and operate at all times as desired, and if the guides 84, 85 are moved to one side or the other, they still control the dagger 74 in such a way that the dagger is always under control to be inoperative on the rollers on the operating gear 105 or to operate the rolls as selected from the pattern chain.

The arm 118 of said bell crank lever 115 has therein a screw 119 which extends through a longitudinal slot 120 in a link 121. Preferably we provide a coiled spring 122 connected to the screw 119 and to a screw 123 at the lower end of the link 121. The function of said spring is to hold the lower slide 85 steady, as will be evident from the further description of the mechanism. We also provide a coiled spring 124 connected to the screw 123 and to a screw or pin 125 attached to the framing. The puropse of said coiled spring 124 is to elevate or tend to elevate the link 121.

In the present disclosure of our invention, movement is imparted to the link 121, and consequently to the slide 85, in the following manner:

Pivoted upon the framing at 126 (indicated most clearly in Fig. 10) is a lever 127, the arm 128 whereof is pivotally connected at 129 to the link 121. The other arm 130 of said lever 127 has secured thereto a block or lateral extension 131 (shown most clearly in Fig. 9) which rides upon the links of a pattern chain, generally indicated at 132 in the several views. Certain of the links of said pattern chain are devoid of lugs, such, for example, as the plain link 133. Others of said links have low lugs 134 and still other links have high lugs 135. Therefore, the lever 127 is rocked in accordance with the character of the links of the pattern chain. If a link which is presented to the lever 127 is provided with a low lug, such as 134, the to-and-fro movable element or dagger 74 is brought into a neutral position,—that is, into the central position shown in Fig. 9. If a link (such as 133) is presented which is devoid of a lug, the guide 85 is moved to the left viewing Fig. 12, and the disk 105 is turned in a contraclockwise direction. If a link having a high lug 135 is presented to the lever 127, the guide 85 is moved to the right viewing Fig. 12 and the disk 105 is turned in a clockwise direction.

It is to be understood that any other suitable means may be employed to move, desirably automatically, the element or dagger 74 transversely, so that it may act upon the rolls 107 upon the face of the disk 105, to one side or the other of the axis of said disk.

Referring to Fig. 9, it will be noted that suitably secured to the framing by bolts 136, 137, are two members 112, 113, already referred to. The inner edges of the members 112, 113 are cam-shaped as indicated at 138, 139. The cam formations may be varied as found suitable but in the disclosed embodiment of the invention the construction is such that the cam shaped edges 138, 139 converge or approach each other and are adapted to be engaged respectively by edges of the laterally projecting parts 76, 77 of the dagger 74. The two members 112, 113 are connected by a strap 140 under which the dagger 74 moves.

We provide any suitable means for moving one or both of the pawls 93, 101 out of action. For this purpose we have represented a curved lever arm 141 clearly shown in Figs. 9 and 10, which, when lifted, engages the pin 96 on the pawl 93 and lifts said pawl. The curved lever 141 is pivoted at 142 upon the framing, and fast therewith (as shown in Fig. 9) is another lever arm 143 to which is pivotally connected at 144 an operating rod 145 (see Fig. 5), which itself is pivoted at 146 to a lever 147 mounted on the stud 148, the front end of said lever 147 being operated by a cam 149 on the drum 150 on shaft 4 (see Fig. 1).

As shown most clearly in Fig. 5, there is pivoted to the member 112 a lever 151, the end whereof is connected by a coil spring 152 to a bracket 153. Said lever 151 constitutes one form or type of holding or limiting means to prevent over-movement of the disk or rotatory member 105.

The dagger 74 may be permitted to reciprocate or move to and fro idly when in the neutral position shown in Fig. 9 and in such case to enter between and withdraw from the two rolls 107 which happen to be positioned, as shown in Fig. 9, next to the pin of the element or dagger 74.

We prefer, however, to provide means, when the dagger 74 is to reciprocate or move to and fro in its neutral path, to move said element 74 away from the disk 105. Any suitable means may be provided for this purpose. We have, however, in Figs. 5 and 9, represented for the purpose a rod 153'. The said rod 153' is moved in a lengthwise direction by a lever 154 mounted on a stud 155 in the machine frame, and is operated by a cam 156 on the drum 150 which is fast on the shaft 4.

Said rod 153' (shown in Figs. 5, 9 and 10) is pivotally connected at 157 to a lever arm 158 fast to a shaft 159 mounted in the framing. Fast on the shaft 159 therewith is another lever arm 160 which at its upper end is provided with a cross pin 161 (Fig. 5) that takes under the element or dagger 74, so as to lift the same above the rolls 107, whereupon, until lowered, it will move to and fro idly.

The rotatory step-by-step movement of the disk 105 may be utilized in any suitable manner. In the disclosed embodiment of the invention, we have represented means whereby such step-by-step movement is employed to move another element to and fro. Referring to the specific embodiment or construction herein selected for illustration of the application of our invention, the disk 105 is provided with teeth 162 (Fig. 9) with which mesh the teeth of a pinion 163 suitably supported and surrounding a screw 164, which, therefore, is moved axially in one direction or the other by the step-by-step movement of the disk 105. The screw 164 imparts movement to suitable parts hereinafter to be described.

Referring to Figs. 2, 10, it is sometimes desirable, when the drum 31 has reached the limit of movement in either direction, to provide means to act upon the slide 85 (Fig. 12), thereby to bring it into its neutral position (that is, into the position where the element or dagger 74 will move to and fro without functioning to turn the disk 105 in either direction). For this purpose, we have indicated a lever 165 pivoted at 166 and having an arm 167 adapted to be struck at either the upper face or the lower face thereof by respective collars to be hereinafter described (shown in Fig. 2 at 199 and 200). When the lever 165 is in the horizontal position shown in Figs. 2 and 10, the slides 84, 85 are in their central or neutral position. The lever 165 has an arm 168 forked as indicated at 169 to engage the arm 118 of the bell crank lever 115 (shown in Fig. 12).

It will be clear from the foregoing description that the to and fro movement of the gear or element or dagger 74 results in a step-by-step rotatory movement of the gear or element 105, and that said element 105 is rotated in either direction as long as desired according to the dictates of the controlling means, and that said element 105 is locked or held from over-movement upon each step movement, so that a very great accuracy is obtained. This is of very great importance when the ultimately moved part controls some delicate mechanism, such as the jacquard drum and associated parts herein described.

We will next describe the mechanism for raising and lowering the jacquard or selector drum 31, and refer particularly to Figs. 14 to 21. This drum, in the disclosed embodiment of the invention, is either raised or lowered one-eighth of an inch at a time, this being the distance from the center of one butt to the center of the next butt on a selector strip 37.

Fast to the upper end of the screw 164 (see also Fig. 9) is a bracket 170. On the upper edge of the bracket 170 is fastened a cam 171, having an upper face 172 and a lower face 173, and also a cam-shaped slot 174 therebetween. On the under side of the cam 171 is a cam-shaped surface 175 which will be hereinafter described. The screw 164, being raised or lowered one-eighth of an inch, the bracket 170 and the cam 171 will be moved accordingly. On the inner end of the bracket 170 is mounted a cam 176 (Fig. 16) which will later be described. The two supporting members 177, 178 are each provided with two vertical supporting rods 179, 180, which carry at their upper ends each half respectively of the selector drum. The supporting members 177, 178 are rotating one revolution to each revolution of the needle cylinder and are each independently operated. The member 177 is raised or lowered by a cam 181, which is fastened by screws to the upper side of the member 177. When the screw 164 raises or lowers the member 177, the cam 181 will always be in the cam-shaped slot 174 which in turn acts to raise the member 177, thereby also raising or lowering one-half of the jacquard or selector drum 31. The member 178 is at this time in a locked position (see Figs. 14 and 15) which is one-eighth of an inch below the member 177. On the member 178 is mounted a lock 182 on a stud 183 which engages the circumferential groove 183' on the jacquard or selector drum shaft 30. On the same stud 183 and fast to the lock 182 by screws 184 is an extension lever 185, the rounded end whereof operates on either the upper or lower faces 172, 173 of the cam 171. On the under side of the member 178 is mounted a segment 186, which carries a roll 187, hereinafter described.

The members 177, 178 being rotated in a contraclockwise direction, the extension lever 185 comes in contact with the lower face 173 of cam 171, disengaging the lock from the groove 183' on the selector drum shaft 30. At this period the roll 187 will come in contact with the inclined surface 188 of the cam 176 and raise the member 178 one-eighth of an inch, both members being now on the same level, which in turn brings both parts of the selector drum even on a horizontal line, so that the butts on the selector strip will be on the same level to select the dial jacks properly.

When the roll 187 rides on the top surface of the cam 176, the extension lever 185 will snap into the cam-shaped slot 174, which in turn allows the lock 182 to hold the member 178 in a groove 183' one eighth of an inch higher than the previous position. The stud 183 carrying the extension lever 185 is mounted and turns in the member 178 (see Fig. 21). Fast to the lower end of the stud 183 is another lever 189, which carries a coil spring 190 fastened to a screw 191 in the opposite member 177, the said spring snapping the extension lever 185 into the cam slot 174. The extension lever 185 carrying the lock 182, and the lever 189, all turn together with the stud 183. A guide 192 keeps the lock 182 in alignment with the grooves 183' in the selector drum shaft 30. On the under side of the member 177 is a supporting segment 193 which turns on the ball thrust bearing 194 on the inner hub of the bracket 170 supporting the member 177 and the half of the selector drum and its immediate parts.

On the inner side of the member 177 is a supporting bracket 195 to keep this member and immediate parts in alignment with the jacquard or selector drum shaft 30. To move the jacquard or selector drum downward, the member 177 with the cam 181 in the cam slot 174 is dropped one-eighth of an inch by the screw shaft 164. To bring the member 178 to the same level, (in the event it does not drop by its own weight) a cam 196, which is fastened to the under side of this member, comes in contact with the cam-shaped surface 175 underneath the cam 171. At this point the extension lever is riding on the upper surface 172 and releases the lock 182 from the groove 183' in the selector drum shaft, allowing the surface of cam 192 to operate on the under side of cam 175, and in so operating the extension lever snaps into the cam slot 174, allowing the lock to engage the next groove 183' in the jacquard or selector drum shaft one-eighth of an inch lower than the previous position, thus bringing the members 177, 178 onto the same level, which in turn will bring both parts of the jacquard or selector drum on a horizontal line so that the butts on the selector strips will be on the same level.

A depending rod 198 fast to the under side of the bracket 170 carries two collars, the upper collar 199 engaging the lever 167 on the downward movement of the jacquard or selector drum, and the lower collar 200 controlling the upward movement of the jacquard or selector drum. These collars are set on the rod 198 governing the upward and downward movement of the jacquard or selector drum according to the pattern set-up, also to prevent the said drum from raising or lowering out of position with the dial jacks.

We will next describe the cams and cam paths for the sinkers.

Referring to Figs. 29 and 30, when the sinker head jacks 52 are raised in the position shown at the right of Fig. 30, the butts will miss the cam 201 (which is movable in and out) and the stationary cam 202, and will engage the inner surface 203 of the cam 204 and will follow the path 205 until they strike the inner edge 206 of cam 207, when they will be pushed in for reverse plating. The butts will then be moved out by the outer edge 208 of the cam 209. A cam 210 prevents the sinker head jacks from sliding too far out in their respective slots after following the path 211. The cam 212 sinks the jacks and also evens them to the proper radius, and another cam 213 evens the jacks just before they come in contact with the dial jacks.

When the sinker head jacks 52 are in their down position as shown at the left of Fig. 30, they come in contact with the under surface 214 of the cam 204 and are held in their sunken position all the way around until they are selected by dial jacks for reverse plating.

The butts of the sinkers travel in the path 215 and then engage the cam surface 216, and are withdrawn by the cam 217, so that the yarn is fed to the needles in the usual manner.

The movable cam 201 is slidingly moved out in an inclined path, and brings all the sinker head jacks to their out position, provided they have been pushed in by the dial jacks, and are sunk by cam 204, for reciprocating knitting.

As shown most clearly in Figs. 1, 4, 4a and 4b, the movable cam 201 is operated by a rod 218 pivoted at 219 (Fig. 1) to a lever 220 which is operated by a cam 221 on the drum 150. The upper end of the rod 218 has a bar 222 on which slides the arm 223 of a bell crank lever 224 pivoted at 225 on a suitable bracket or support 226. The other arm 227 of said bell crank lever engages a notch 228 in a sliding block 229 carried by screws 230 in the bracket 226 on the sinker head cap.

On the lower side of the block 229 is the cam 201. This cam is moved out when the block 229 is moved to the right (see Fig. 4b) by the upward movement of the rod 218 when on the cam 221. An adjusting screw 231 limits the movement of the sliding block 229 which is moved to in-position by a coiled spring 229'.

We will next refer to the switch or dividing cam which controls the making of a plain sole.

While making a plain sole, one half of the dial jacks having the central butt 52a, which engages the beveled edge 232 of the switch or dividing cam 233 (see Fig. 26), are moved into their inward position to stay effective for normal plating only. The other half of the dial jacks, being those without the central butts 52a, are used as selected to operate on the sinker jacks while reverse plating in the foot. The switch or dividing cam 233 has a raised and lowered position and when operating in its lowered position it engages only the central butts 52a of the sinkers. These two positions are secured or provided for by a pin 234 in a cam shaped slot 234' (see Fig. 28) in a flat piece 235 fastened to a rod 236 by screws 237.

This rod 236 and the switch or dividing cam 233, supported in guide blocks 238, 239 (Figs. 4 and 28) on the upper side of the dial cap 46, are moved into position by a bell crank lever 240 pivoted at 241 (Figs. 3 and 4) on a bracket 242 attached to the carrier ring post. Pivoted to the bell crank lever 240 at 243 (shown in Fig. 3) is a rod 244 which is pivoted at 245 to a side lever 246 on the stud 148 in the frame. The front end of the lever 246 is operated by a cam 247 on the drum 150 (see Fig. 5). The cam 248 in the dial cap is for the purpose of drawing all the dial jacks into their inward position so that they will be sunk and not interfere with the sinker jacks while in reciprocating knitting (see Fig. 26). A cam 249 draws all the jacks 43 to their outward position (see Fig. 26) ready to be moved inward by a butt of the selector strip 37 (see Fig. 23) or left in their outer position to operate on the sinker jacks.

A bar 250 (see Fig. 4), telescoping another bar 251, and adjustable by screws 252, 253, holds the dial cap from rotating.

Having thus described one illustrative embodiment of the invention and the method practised thereby, it is to be understood that although specific terms are employed, they are used in a generic and descriptive sense and not for purposes of limitation, the scope of the invention being set forth in the following claims.

We claim:

1. A circular knitting machine having indeendent needles and having means to feed a plurality of yarns thereto in a plating relation, sinkers cooperating with one or more of the yarns to effect change from normal plating to reverse plating, or vice versa, and a jacquard or selector member having means to control the sinkers individually for each needle wale in each course of an extended fabric, whereby changes from normal to reverse plating or from reverse plating to normal plating can be made at any single stitch in any course of the fabric.

2. A circular knitting machine having independent needles and having means to feed a plurality of yarns thereto in a plating relation, sinkers cooperating with one or more of the yarns to effect change from normal plating to reverse plating, or vice versa, a jacquard or selector drum, means to rotate the same and to move the same axially, said drum being provided with lengthwise extending pattern strips, a dial member having dial jacks, one for each sinker of the machine, adapted to act upon said sinkers according to the dictates of said pattern strips and thereby to make changes from normal plating to reverse plating at any stitch in any course as dictated by said pattern strips.

3. In a jacquard control for reverse plating mechanism in an independent needle, circular knitting machine, a jack adapted to be controlled by a patterning member, said jack having, at the end acted upon by said patterning member, two projections of unequal length in vertical alignment, and a cam operated butt adjacent to the other end of the jack.

4. In a jacquard control for reverse plating mechanism in an independent needle, circular knitting machine, a dial member and a series of dial jacks mounted therein for in and out movement in response to the dictates of a jacquard control member, each said jack having at one end extensions of unequal length, extending lengthwise of the jacks.

5. In a jacquard control for reverse plating mechanism in an independent needle, circular knitting machine, a dial member and a series of dial jacks mounted therein for in and out movement in response to the dictates of a jacquard control member, each said jack having at one end extensions 50 and 51 of unequal length, each jack also having at its opposite end a sloping edge and the dial member having a co-acting sloping formation.

6. In a jacquard control for reverse plating mechanism in an independent needle, circular knitting machine, a dial member having an inclined surface such as 44 and a series of jacks such at 43 having at their inner ends inclined edges to co-act with said surface 44.

7. In a jacquard control for reverse plating mechanism in an independent needle, circular knitting machine, a dial member having an inclined surface, such as 44, and a series of jacks, such as 43, having at their inner ends inclined edges to co-act with said surface 44, said jacks at their outer ends having two prolongations of unequal length cooperating with a jacquard control member.

8. In a jacquard control for reverse plating mechanism in an independent needle, circular knitting machine, a dial member having a dial plate 41 provided with an annularly inclined surface 44 and dial jacks 43 having beveled inner ends to ride upon said inclined surface 44.

9. In a jacquard control for reverse plating mechanism in an independent needle, circular knitting machine, a dial member and a series of dial jacks therein having intermediate their ends butts, such jacks each having a formation adjacent to one end thereof adapted to be actuated by a cam and having adjacent to the other end a formation for engagement by selector means and another formation for in turn selecting another element, the last mentioned formations on each jack being unequally spaced from the formation first mentioned.

10. In a jacquard control for reverse plating mechanism in an independent needle, circular knitting machine, a dial member and a series of dial jacks therein having intermediate their ends butts, such jacks each having a formation adjacent to one end thereof adapted to be actuated by a cam and having adjacent to the other end a formation for engagement by a selector means and another formation for in turn selecting another element, the last mentioned formations on each jack being unequally spaced from the formation first mentioned, and a switch or dividing cam adapted to act upon said butts.

11. In a jacquard control for reverse plating mechanism in an independent needle, circular knitting machine, a dial member having a series of dial jacks 43 provided at their inner ends with downwardly inclined edges, and intermediate their ends having butts 52a and at their outer ends having projections 50, 51 of unequal length.

12. In a jacquard control for reverse plating mechanism in an independent needle, circular knitting machine, a dial member having a series of dial jacks 43 provided at their inner ends with downwardly inclined edges, and intermediate their ends having butts 52a and at their outer ends having projections 50, 51 of unequal length, and a jacquard drum having lengthwise extending strips 37 provided with butts and sinkers coacting with said unequal length projections.

13. In a jacquard control for reverse plating mechanism in an independent needle, circular knitting machine, a dial member having a plate 41 with an annular inclined formation 44, a series of dial jacks having inner beveled ends to ride upon said inclined formation, and certain of said jacks having butts, such as 52a, intermediate their ends and at their outer ends all of said butts having unequal length projections in the same vertical plane.

14. In a jacquard control for reverse plating mechanism in an independent needle, circular knitting machine, a dial having a dial plate with an annular inclined surface, such as 44, and a dial cap having a fixed cam and a series of dial jacks having formations adapted to ride along said inclined surface 44 into and out of engagement with said fixed cam.

15. In a jacquard control for reverse plating mechanism in an independent needle, circular knitting machine, a dial having a dial plate with an annular inclined surface, such as 44, and a dial cap having a fixed cam and a series of dial jacks having formations adapted to ride along said inclined surface 44 into and out of engagement with said fixed cam, and a jacquard drum having formations to act upon said jacks whereby they are caused collectively to be brought into engagement with said fixed cam.

16. In a jacquard control for reverse plating mechanism in an independent needle, circular knitting machine, a dial having a dial plate with an annular inclined surface, such as 44, and a dial cap having a fixed cam and a series of dial jacks having formations adapted to ride along said inclined surface 44 into and out of engagement with said fixed cam and a jacquard drum having formations to act upon said jacks whereby they are caused colectively to be brought into engagement with said fixed cam, in combination with a circular series of independent needles, a corresponding series of sinkers and a corresponding series of sinker jacks.

17. In a jacquard control for reverse plating mechanism in an independent needle, circular knitting machine, a dial having a dial plate with an annular inclined surface, such as 44 and a dial cap having a fixed cam and a series of dial jacks having formations adapted to ride along said inclined surface 44 into and out of engagement with said fixed cam, and a jacquard drum having formations to act upon said jacks whereby they are caused collectively to be brought into engagement with said fixed cam, in combination with a circular series of independent needles, a corresponding series of sinkers and a corresponding series of sinker jacks, the sinker bed ring having an annular inclined surface, such as 57, and the said sinker jacks having beveled formations to engage said inclined surface.

18. In a jacquard control for reverse plating mechanism in an independent needle circular knitting machine, a circular series of independent needles, a corresponding series of reverse plating sinkers, a jack for each sinker positioned thereunder and in the same groove therewith, and having an inclined outer end, the sinker ring bed plate having an angular inclined formation 57 to co-act with said inclined outer ends.

19. In a jacquard control for reverse plating mechanism in an independent needle circular knitting machine, a dial disk provided with a circumferential series of radially slidable jacks, a stationary cam on the dial disk for withdrawing all jacks for re-selection, a movable switch cam adapted to act upon jacks having special formations, and means to move said switch cam periodically into action.

20. In a jacquard control for reverse plating mechanism in an independent needle circular knitting machine, a dial disk having a series of radially movable jacks therein to act upon sinkers that effect changes from normal to reverse plating, and means to provide for the making of a plain sole including special formations upon certain of said jacks and a switch or dividing cam adapted to act upon said special formations, and means to move said cam into functioning position for the making of a plain sole.

21. In a jacquard control for reverse plating mechanism in an independent needle circular knitting machine, a series of dial jacks 43, certain of said jacks having intermediate butts 52a, the other jacks of said series having had their similarly positioned butts broken off so that such jacks will not be acted upon by the means acting upon all jacks which retain their said intermediate butts, in combination with sinkers individual to the jacks and adapted to be selectively controlled by them.

22. In a jacquard control for reverse plating mechanism in an independent needle circular knitting machine, a circular series of independent needles, a sinker cap having a series of radially movable sinkers and jacks, cams to effect the in and out movement of the sinkers and jacks and a guard cam extending along the back of the rear side sinker cams for the purpose of steadying the jacks in their outer position.

23. In a jacquard control for reverse plating mechanism in an independent needle circular knitting machine, a circular series of independent needles, a sinker cap having a series of radially movable sinkers and jacks, cams to effect the in and out movement of the sinkers and jacks, and a guard cam extending along the back of the rear side sinker cams for the purpose of steadying the sinkers in their outer position, and a cam to insure that the jacks are all rendered inoperative until reselected.

24. In a jacquard control for reverse plating mechanism in an independent needle circular knitting machine, a circular series of independent needles, a sinker cap having a series of radially movable sinkers, a corresponding series of sinker jacks under and cooperating with said sinkers, sinker cams to effect the in and out movement of the sinkers and their jacks, and a guard cam extending along the back of the rear side sinker cam for the purpose of steadying the jacks in their outer position.

25. In a jacquard control for reverse plating mechanism in an independent needle circular knitting machine, a circular series of independent needles, a sinker cap having a series of radially movable sinkers, a corresponding series of sinker jacks under and cooperating with said sinkers, sinker cams to effect the in and out movement of the sinkers and their jacks, a guard cam extending along the back of the rear side sinker cam for the purpose of steadying the jacks in their outer position, and a cam or cams to make certain that the sinker jacks are all rendered inactive until reselected in a subsequent course.

26. In a jacquard or selector drum control for independent needle knitting machines, a jacquard or selector drum having two cooperating members constituting opposite portions of said drum, and means to impart incremental axial movements to said members, said means including a cam having faces and a formation therebetween adapted alternately to effect movements of the drum portions in the same direction.

27. In a jacquard or selector drum control for independent needle knitting machines, a jacquard or selector drum having two cooperating members constituting opposite portions of said drum, and means to impart incremental axial movements to said members, said means including a cam having faces, and a formation therebetween, and also including a cam shaped surface and means cooperating therewith, said means effecting movements in the same direction of both portions of the drum alternately.

28. In a jacquard or selector drum control for independent needle knitting machines, a jacquard or selector drum having two cooperating members constituting opposite portions of said drum, means to impart incremental axial movements to said members, said means including a cam having two cam formations, and a formation therebetween adapted to impart movement to at least one of the members, a screw, to raise and lower the cam, and a cooperating cam adapted to impart movement to one of the cooperating members.

29. In a jacquard or selector drum control for independent needle knitting machines, a jacquard or selector drum having two cooperating members constituting opposite portions of said drum, means to impart incremental axial movements to said members, said means including two supporting members and means for independently operating them alternately to effect movements of the portions of the drum, said means last mentioned including cams for the two members.

30. In a jacquard or selector drum control for independent needle knitting machines, a jacquard or selector drum having two cooperating members constituting opposite portions of said drum, means to impart incremental axial movements to said members, said means including two supporting members, means for independently operating them including cams for the two members, and co-acting means whereby one of the two cooperating members is alternately locked in operating position.

31. In a jacquard or selector drum control for independent needle knitting machines, a jacquard or selector drum having two cooperating members constituting opposite portions of said drum, and means to impart incremental axial movements to said members, said means including a shaft, annular grooves, and two members one of which is adapted to be alternately locked into engagement with said grooves and released therefrom and including cam means for controlling the locking of said member.

32. In a jacquard or selector drum control for circular independent needle machines, a drum adapted to be rotated so as to present its pattern formations, a to and fro movable actuator member, and a rotatory member turned step by step in either direction therefrom, and guiding means for said to and fro movable member including upper and lower guides, and means to move said guides relatively toward and from each other.

33. In a jacquard or selector drum control for circular independent needle machines, a drum adapted to be rotated so as to present its pattern formations, a to and fro movable actuator member, and a rotatory member turned step by step in either direction therefrom, guiding means for said to and fro movable member including upper and lower guides, means to move said guides relatively toward and from each other, and means to impart lateral movement to said guides.

34. In a jacquard or selector drum control for circular independent needle machines, a drum adapted to be rotated so as to present its pattern formations, a to and fro movable actuator member and a rotatory member turned step by step in either direction therefrom, upper and lower guides 84, 85 for said to and fro movable member, and means to move said guides toward and from each other.

35. In a jacquard or selector drum control for circular independent needle machines, a drum adapted to be rotated so as to present its pattern formations, a to and fro movable actuator member and a rotatory member turned step by step in either direction therefrom, upper and lower guides 84, 85 for said to and fro movable member, means to move said guides toward and from each other, and pattern controlled means for imparting lateral movements to, at least, one of said guides, thereby to shift the position of said to and fro movable members.

36. In a jacquard or selector drum control for circular independent needle machines, a drum adapted to be rotated so as to present its pattern formations, a to and fro movable actuator member and a rotatory member turned step by step in either direction therefrom, upper and lower guides 84, 85 for said to and fro movable member, means to move said guides toward and from each other, and pattern controlled means for imparting lateral movements to, at least, one of said guides, thereby to shift the position of said to and fro movable members, said means including a bell crank lever 115, a cooperating lever 165, and means periodically to impart movement in opposite directions to said lever 165.

37. In a jacquard or selector control mechanism for effecting reverse plating, a dial cap, an annular series of radially sliding jacks adapted to be moved in and out by said jacquard or selector control mechanism, certain of said jacks having intermediate upwardly extending butts 52a, a dividing or switch cam 233 adapted to act upon said butts, and pattern control means for periodically moving said cam.

38. A jack for use in a jacquard or selector mechanism for independent needle circular knitting machines, said jack having at one end a downwardly outwardly inclined edge 45 and at its opposite end two projections 50, 51 extending unequal distances in a direction lengthwise the said jacks.

39. In a jacquard control for reverse plating mechanism in an independent needle, circular knitting machine, a dial member and a series of dial jacks therein, such jacks each having a formation adjacent to one end thereof adapted to be actuated by a cam and having adjacent to the other end a formation for engagement by selector means and another formation for in turn selecting another element, the last mentioned formations on each jack being unequally spaced from the formation first mentioned.

40. A jack for use in knitting machines having adjacent to one end thereof a formation for engagement by a cam, and having adjacent to the other end thereof two formations extending substantially at right angles to the length of the jack, the said two formations being unequally spaced from the formation first mentioned.

ROBERT H. LAWSON.
ARTHUR N. CLOUTIER.
ALFRED L. HUTTON, Jr.